*Hough & Jones,*
*Brick Machine.*
No. 16,839. Fig. 1. Patented Mar. 17, 1857.
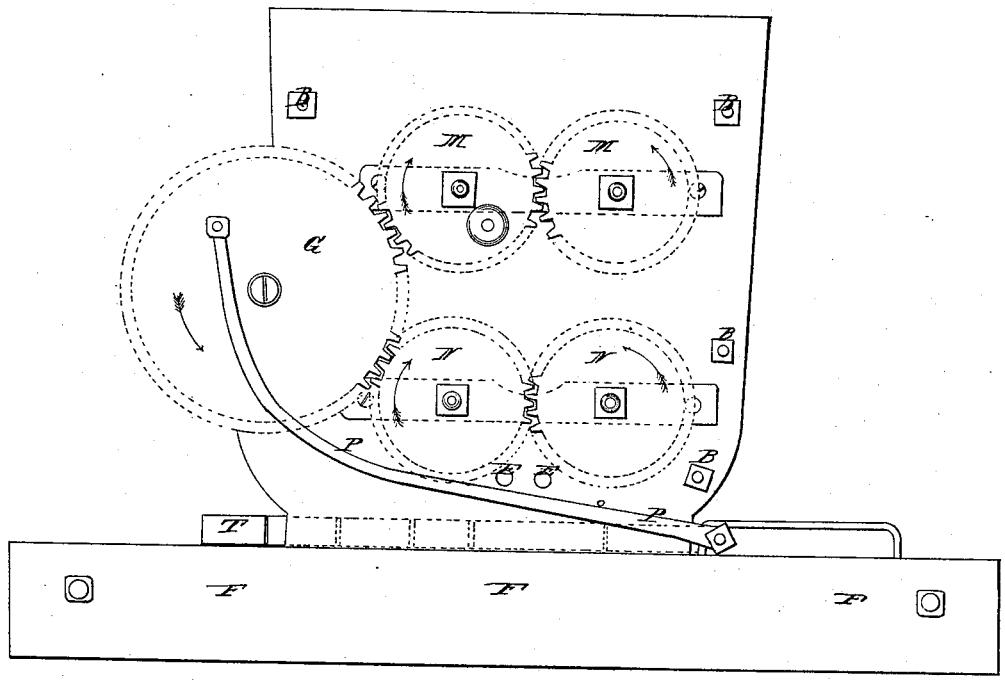
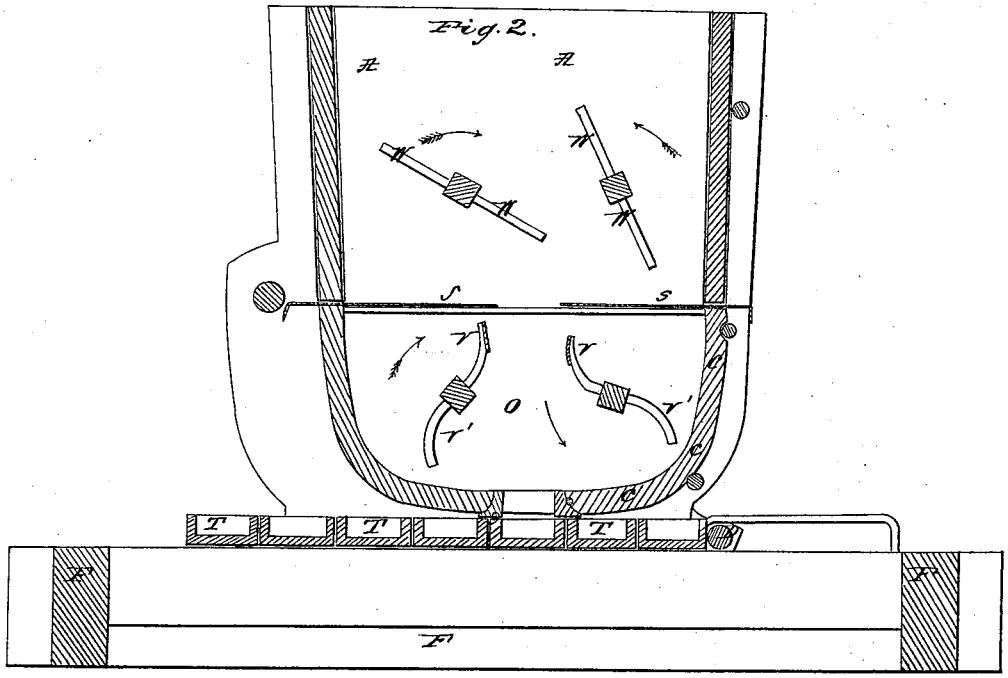
Fig. 2.

*Hough & Jones,*
*Brick Machine.*
Nº 16,839.  Patented Mar. 17, 1857.
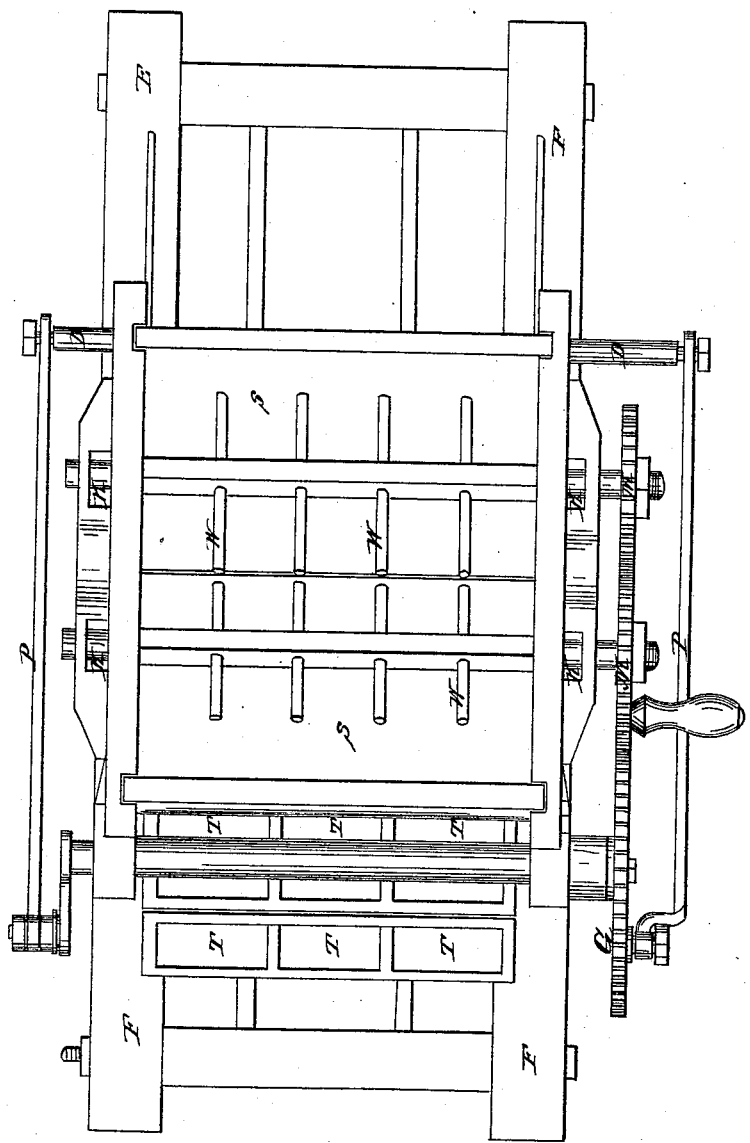

UNITED STATES PATENT OFFICE.

ALMOM V. HOUGH AND RICHARD W. JONES, OF GREENCASTLE, INDIANA.

BRICK-MACHINE.

Specification of Letters Patent No. 16,839, dated March 17, 1857.

*To all whom it may concern:*

Be it known that we, ALMOM V. HOUGH and RICHARD W. JONES, both of Greencastle, county of Putnam, and State of Indiana, have invented a new and Improved Mode of Making Brick; and we do hereby declare that the following is a full, clear, and exact description of the construction and operation of the same, reference being had to the accompanying drawings, made a part of this specification, in which—

Figure 1, is a side elevation; and Fig. 2 a sectional view; and Fig. 3, a top view.

The nature of our invention consists in the use and application of two horizontal shafts; within a perforated molding chamber, having oval or flanged wings on one side and arms or beaters on the other side, acting both as mixers and pressers, revolving together inversely, cutting off, from above, a sufficiency of mud to fill the molds.

To enable others to make and use our invention, we will describe its construction and operation.

The machine has two apartments; made in any of the known forms. The mixing apartment is placed above and joined to the molding apartment, and is supplied with a greater or less amount or number of beaters, as different mud requires more or less mixing. The lower or molding apartment is perforated to allow confined air to escape; within which molding apartment revolve the shafts having oval or flanged wings on one side, and arms or beaters on the opposite side, which are given a greater or less angle as a greater or less pressure may be required, and are combined and operated as follows; reference being had to the accompanying drawings 1, 2 and 3.

Corresponding letters in Figs. 1, 2 and 3 represent corresponding parts.

Fig. 1, gives a side elevation ready for work. F F F represents the frame; B B B B the nuts of the rods which fasten the machine together; M, M, the wheels on the mixing shafts; N N, the wheels on the shafts of the molding apparatus; the wheels M, M and N N working into each other, and into the intermediate slotted wheel G, which has a counterpart slotted crank on the opposite end of its shaft, to which are attached the pitmen P P driving the bar or carriage D, (in Fig. 2,) before which bar D the empty mold is placed and driven under the machine to be filled with mud; after which another empty mold is placed before bar D, driving out and taking the place of the filled mold; the filled mold as it leaves the machine comes in contact with a knife not shown in the drawing, that cuts off all the surplus mud, throwing the surplus mud back into the mold to be filled, leaving the filled molds smoothly cut off and allowing no waste. S shows the sliding plate, having a counterpart sliding plate not shown in Fig. 1, which is withdrawn or closed at pleasure to let into or shut from the molding apartment the tempered mud; thus regulating the amount of feed in the molding apartment, and allowing a greater or less amount of mixing, as required. C C C is a section hung on hinges to be let down to relieve obstruction.

A A in Fig. 2 shows the inside of the pug mill, where the mud is mixed; W W, the beaters that mix the mud; S S, the sliding plates a little withdrawn allowing the descent of the mud between the flanged wings V V and the beaters V' V' which revolving carry and force the same into the molds T T T. These flanged wings V V and beaters V' V' in their revolutions commence a vertical and end with a lateral pressure, completely filling, without disturbing the sand on the molds; thus allowing the brick to be easily relieved therefrom. The beaters V' V' have the same angle as the oval or flanged wings V V and have a compressive force equal to the consistency and weight of the mud above, so that should more mud be brought to the molds than will fill them, it is forced back between the beaters.

In Fig. 1, E, E, are apertures or openings through which the confined air is allowed to escape.

In Fig. 3, K K K K are spaces or openings in the boxing under the journals allowing the mud and water to escape and fall freely, and not pass into, and rapidly wear away the boxing and journals.

The clay may be watered or soaked in pits as usual, or may be put into the pug mill dry and watered therein; when by one application of power all the parts are set in motion; thus mixing and molding are carried on, and complete and perfect brick are rapidly made, as already shown and described.

What we claim as our invention and desire to secure by Letters Patent is—

The use and application of two horizontal shafts, provided with oval or flanged wings V on one side, and arms or beaters V' on the opposite side, in the lower perforated chamber O, and in combination therewith, for the purpose of molding and pressing the brick in the manner and for the purpose set forth.

ALMOM V. HOUGH.
RICHARD W. JONES.

Attest:
WILLIAM DAGGY.
McC. HARTLEY,